(12) United States Patent
Harazim

(10) Patent No.: US 7,258,724 B2
(45) Date of Patent: Aug. 21, 2007

(54) METHOD FOR THE SEPARATION OF RESIDUAL GASES AND WORKING FLUID IN A COMBINED CYCLE WATER/STEAM PROCESS

(75) Inventor: Wolfgang Harazim, Zwickau (DE)

(73) Assignee: Rerum Cognitio Gesellschaft fuer Marktintegration Deutscher Innovationen und Forschungsprodukte mbH, Zwickau (DE)

( * ) Notice: Subject to any disclaimer, the term of this patent is extended or adjusted under 35 U.S.C. 154(b) by 304 days.

(21) Appl. No.: 10/530,820

(22) PCT Filed: Jul. 14, 2003

(86) PCT No.: PCT/DE03/02366

§ 371 (c)(1),
(2), (4) Date: Apr. 8, 2005

(87) PCT Pub. No.: WO2004/009963

PCT Pub. Date: Jan. 29, 2004

(65) Prior Publication Data

US 2006/0117735 A1    Jun. 8, 2006

(30) Foreign Application Priority Data

Jul. 14, 2002    (DE) .............................. 102 31 901

(51) Int. Cl.
*F25J 3/00* (2006.01)
(52) U.S. Cl. .......................................... 95/39; 60/39.52
(58) Field of Classification Search .................... 95/39; 62/600–657, 93, 86; 60/39.52, 39.182, 272
See application file for complete search history.

(56) References Cited

U.S. PATENT DOCUMENTS 4,823,546 A * 4/1989 Cheng .......................... 60/774

(Continued)

FOREIGN PATENT DOCUMENTS

EP    1 038 094 B1    9/2000

(Continued)

OTHER PUBLICATIONS

Hongguan Jin et al.: "A novel gas turbine cycle with hydrogen-fueled chemical looping combustion", *International Journal of Hydrogen Energy*, vol. 25, No. 12, 2000, pp. 1209-1215.

*Primary Examiner*—Frank Lawrence
*Assistant Examiner*—Robert Clemente
(74) *Attorney, Agent, or Firm*—Laurence A. Greenberg; Werner H. Stemer; Ralph E. Locher

(57) ABSTRACT

The invention relates to a method for the separation of residual gases and working fluid in a combined cycle water/steam process, which provides for the multi-stage compression and multi-stage expansion of the mixture of working fluid and reaction products from the additional liquid and/or gaseous fuels, by the use of steam. The aim of the invention is the minimisation of the working fluid losses and minimisation of the additional necessary energy use. Said aim is achieved, whereby the expanded exhaust gas from the high pressure turbine stage (19) is subjected to a cooling process which cools the same to the condensation temperature of the steam contained in the exhaust gas (6). The non-condensed parts of the exhaust gas (6) are bled off, whereby the condensation of the working fluid, the bleeding off of non-condensed residual gases (25), the depressurisation of the working fluid condensate and the evaporation of the condensed working fluid are carried out in a residual gas separator (10).

4 Claims, 2 Drawing Sheets

U.S. PATENT DOCUMENTS

| | | | |
|---|---|---|---|
| 4,841,721 A * | 6/1989 | Patton et al. | 60/775 |
| 5,331,806 A * | 7/1994 | Warkentin | 60/39.465 |
| 5,442,906 A * | 8/1995 | Broadus | 60/39.182 |
| 5,644,911 A * | 7/1997 | Huber | 60/775 |
| 5,842,345 A * | 12/1998 | Scharpf | 60/649 |
| 5,896,740 A * | 4/1999 | Shouman | 60/39.182 |
| 6,038,848 A * | 3/2000 | Frutschi | 60/775 |
| 6,089,024 A * | 7/2000 | Hatanaka | 60/671 |
| 6,282,883 B1 * | 9/2001 | Uematsu et al. | 60/39.182 |
| 6,530,226 B1 * | 3/2003 | Harazim | 60/775 |
| 6,684,643 B2 * | 2/2004 | Frutschi | 60/772 |
| 6,910,335 B2 * | 6/2005 | Viteri et al. | 60/786 |
| 6,925,818 B1 * | 8/2005 | Brown | 62/86 |
| 2001/0042367 A1 | 11/2001 | Frutschi et al. | |
| 2002/0134085 A1 * | 9/2002 | Frutschi | 60/772 |
| 2003/0233830 A1 * | 12/2003 | Marin et al. | 60/649 |
| 2004/0065088 A1 * | 4/2004 | Viteri et al. | 60/772 |
| 2004/0177617 A1 * | 9/2004 | Frutschi et al. | 60/772 |
| 2004/0200205 A1 * | 10/2004 | Frutschi et al. | 60/39.52 |

FOREIGN PATENT DOCUMENTS

| | | |
|---|---|---|
| WO | WO99/30018 | 6/1999 |
| WO | WO 03/069131 A1 | 8/2003 |

* cited by examiner

Steam ———
Water ———
Exhaust gas ‑ ‑ ‑

METHOD FOR THE SEPARATION OF RESIDUAL GASES AND WORKING FLUID IN A COMBINED CYCLE WATER/STEAM PROCESS

BACKGROUND OF THE INVENTION

Field of the Invention

The invention relates to a method for the separation of residual gases and working fluid in a combined cycle water/steam process ("WDK process") which, using steam as working fluid and other liquid and/or gaseous fuels, provides for multi-stage compression of the working fluid and multi-stage expansion of the mixture consisting of working fluid and reaction products of the other liquid and/or gaseous fuels, the energy supply in the form of fuels being provided directly before or at the blading of selected turbine stages. Such technical solutions are required in the production of useful energy by means of the WDK process using additional fuels as primary energy carriers.

For broad practical application, the combined cycle water/steam process, which is known per se, has the disadvantage that only pure hydrogen can be used as fuel gas for efficient internal combustion. In an actual combustion process, residual gases are formed to a greater or lesser extent in addition to steam, which affect the WDK process as far as materials and/or safety are concerned. Previously known technical solutions involve channeling such residual gases out as required, with great technical complexity, at several exposed plant locations, if necessary accepting losses of the working fluid, steam. According to the technical solution described in EP 1 038 094 B1, hydrogen and oxygen are used as primary energy carriers directly at the blading of the high-pressure turbine stage. If use is made of natural fossil fuels, such as fuel oil or natural gas, residual gases which differ qualitatively from the working fluid are formed as combustion products.

In this way, major impairment of the steam power process can occur because increasingly high residual gas concentrations are included in the process without being involved in the steam power process. If contaminated fuels are used, for example sulfur-containing fuels, corrosive impairment is additionally possible. Without energy gain, residual gases included in the WDK process have to be compressed and conveyed and thus reduce the energy efficiency of the WDK process. Reliable technical solutions for eliminating these shortcomings of the prior art are as yet not known.

SUMMARY OF THE INVENTION

The object of the invention is therefore to produce a technical solution with the aid of which the shortcomings of the known prior art can be overcome, in particular to develop a process engineering solution which is suitable for minimizing working fluid losses and at the same time minimizing the useful energy additionally required.

According to the invention, the object is achieved by the features of claim 1. Advantageous developments are described in the subclaims. Accordingly, a method for the separation of residual gases and working fluid in a combined cycle water/steam process (WDK process) provides for the use of steam as working fluid and of other liquid and/or gaseous fuels. In this connection, the working fluid is compressed in multiple stages, and the mixture consisting of working fluid and reaction products from the additional liquid and/or gaseous fuels used is expanded in multiple stages. The energy supply in the form of additional fuels is in this connection provided directly before or directly at the blading of selected turbine stages. The expanded gas from the high-pressure turbine stage is subjected to a cooling process before being compressed again. The cooling of the expanded exhaust gases from the high-pressure turbine stage is carried out at least to the condensation temperature of the steam contained in the exhaust gas.

The uncondensed parts of the exhaust gas from the high-pressure turbine stage are then carried off from the WDK process. The condensation of the working fluid, the leading-off of uncondensed residual gases from the process, the expansion of the working fluid condensate and the evaporation of the condensed working fluid are carried out in a residual gas separator, which is connected upstream of the multi-stage turbocompressor and the low-pressure turbine stage.

In a particular embodiment of the invention, the cooling process of the exhaust gas leaving the high-pressure turbine stage is carried out in multiple stages. In the heat exchanger, part of the energy content of the expanded exhaust gas leaving the high-pressure turbine stage is supplied to the compressed working fluid. In the condensate preheater, another part of the energy content of the expanded exhaust gas leaving the high-pressure turbine stage is transferred to the condensate obtained. The remaining cooling of the working fluid/exhaust gas mixture to the saturation temperature of the working fluid is carried out in the low-pressure steam/exhaust gas cooler directly before the residual gas separator. For reasons of efficient use of the process energy, the evaporation heat required for converting the condensate into the expanded working fluid is obtained at least partly from the condensation heat to be dissipated of the previously condensed working fluid.

The advantages of the method consist in essence in the technical solution now available of as of now carrying out the WDK process, which is in itself superior in terms of energy and is preferably carried out using oxyhydrogen gas as primary energy carrier, with the aid of other suitable primary energy carriers as well. Such primary energy carriers are, for example, natural gas or biogenic or synthetic fuel gases, which when used lead to reaction products which are only partly identical with the working fluid. The substances contained in the exhaust gas which differ qualitatively from the working fluid have to be removed continuously from the process in order to maintain an energy-efficient WDK process. This is now achieved with minimal outlay in terms of apparatus and process engineering by the residual gas separator proposed, which is applied directly before the turbocompressor and the parallel-connected low-pressure turbine stage.

The invention is to be explained in greater detail below with reference to an illustrative embodiment.

DESCRIPTION OF THE PREFERRED EMBODIMENTS

Figure 1:
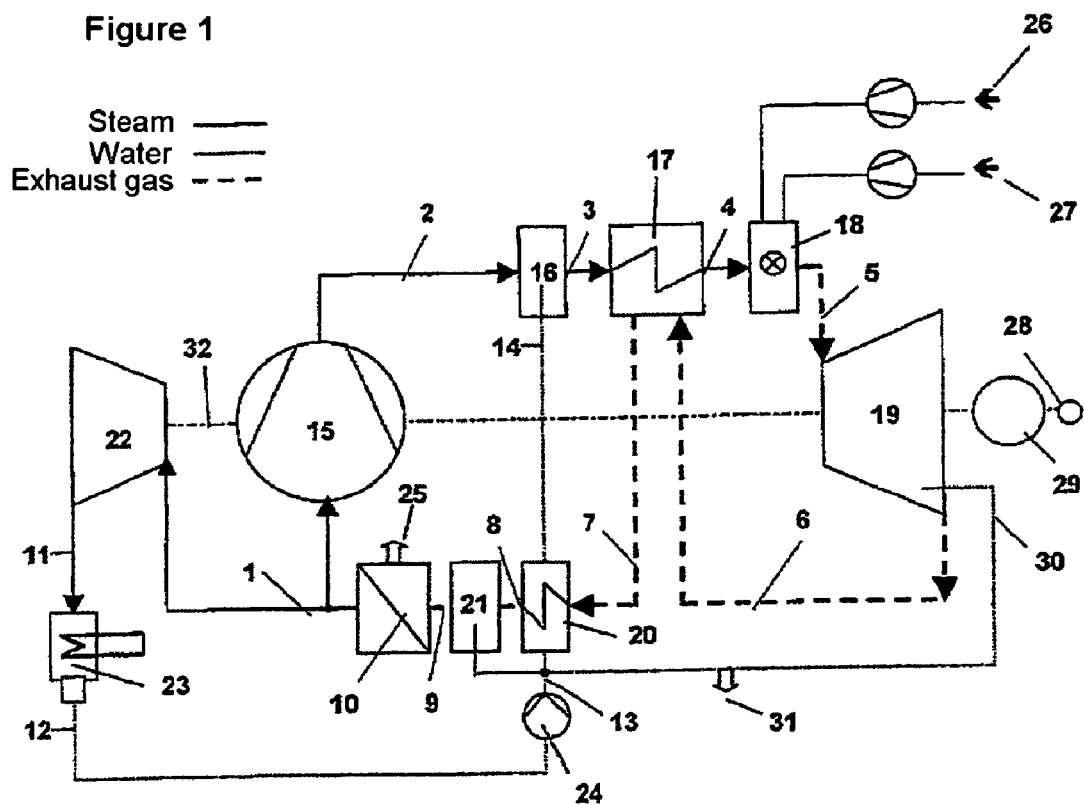
FIG. 1 shows a block diagram of selected components of a plant for carrying out the WDK process.
Figure 2:
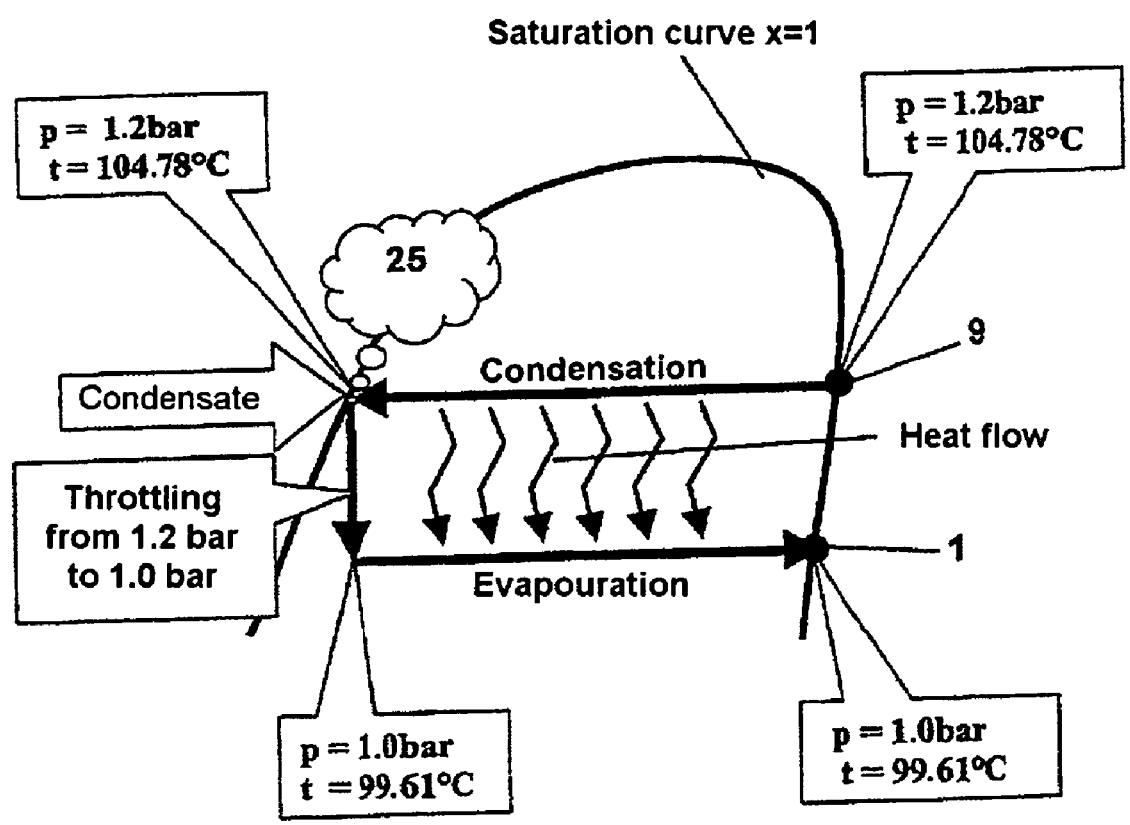
FIG. 2 shows a diagrammatic illustration of the pressure/temperature characteristic for steam in the range of the parameter field used by the residual gas separator.

According to FIGS. 1 and 2, expanded steam 1 is supplied to both a turbocompressor 15 and a low-pressure turbine stage 22. Turbocompressor 15, low-pressure turbine stage 22, high-pressure turbine stage 19, generator 29 and starting motor 28 are arranged on a common shaft 32. Compressed steam 2 is produced and supplied to the high-pressure steam cooler 16 by the turbocompressor 15. Preheated condensate 14, which is delivered by the condensate pump 24, is also fed into this high-pressure steam cooler 16. The compressed, cooled steam 3 passes from the high-pressure steam cooler 16 into the heat exchanger 17. In the heat exchanger 17, part of the sensible heat of the expanded exhaust gas 6 from the high-pressure turbine stage 19 is transferred to the cooled steam 3. Superheated steam 4 now leaves the heat exchanger 17 and is supplied to the heater 18. In the heater 18, natural gas 26 and oxygen 27 are combusted, so that a mixture consisting of superheated steam 4 and the reaction products from the fuel gas reaction 26 and 27 now leaves the heater 18. This mixture 5 passes into the high-pressure turbine stage 19, with the aid of which the mechanical energy imparted to the common shaft 32 is taken from the mixture 5. The expanded exhaust gas 6 from the high-pressure turbine stage 19 first passes into the heat exchanger 17.

The partly cooled expanded exhaust gas 7 from the high-pressure turbine stage 19 is conducted from the heat exchanger 17 to the condensate preheater 20. There, another part of the sensible heat of the expanded exhaust gas 6 leaving the high-pressure turbine stage 19 is transferred to the condensate 13. The further cooled turbine exhaust gas 8 passes from the condensate preheater 20 to the low-pressure steam/exhaust gas cooler 21, with the aid of which, using proportions of the condensate 13, turbine exhaust gas 9 cooled to the saturation temperature is obtained. This cooled turbine exhaust gas 9 is supplied to the residual gas separator 10 at a pressure of 1.2 bar and a temperature of 104.78° C. The steam contained in the turbine exhaust gas 9 condenses on the condensation surfaces. The uncondensed residual gas quantities 25 and the condensate obtained are expanded to 1.0 bar by throttling fittings, the condensate being cooled to a temperature of 99.61° C. On the evaporator side of the condensation surfaces of the residual gas separator 10, the expanded condensate is then evaporated, the evaporation heat being taken from the condensation surfaces to which the condensation heat of the steam supplied to the residual gas separator 10 is transferred. The steam 1 supplied to the low-pressure turbine stage 22 leaves the low-pressure turbine stage 22 as expanded steam 11 and passes into the condenser 23. After the condenser 23, the condensate obtained there is conveyed by the condensate pump 24 and supplied in selectable proportions in parallel to the condensate preheater 20, the low-pressure steam/exhaust gas cooler 21 and the turbine cooling system 30. After the condensate pump 24, surplus condensate is preferably removed from the condensate conveying system via the drain 31.

REFERENCE NUMBER LIST 1 expanded steam before the turbocompressor 15 and before the low-pressure turbine stage 22
2 compressed steam before the high-pressure steam cooler 16
3 compressed steam before the heat exchanger 17
4 superheated steam after the heat exchanger 17
5 mixture after the heater 18 consisting of superheated steam and the reaction product from the fuel gas reaction
6 expanded exhaust gas from the high-pressure turbine stage 19
7 expanded exhaust gas from the high-pressure turbine stage 19 after the heat exchanger 17
8 cooled turbine exhaust gas after the condensate preheater 20
9 cooled turbine exhaust gas after the low-pressure steam/exhaust gas cooler 21
10 residual gas separator
11 expanded steam after the low-pressure turbine stage 22
12 condensate after the condenser 23
13 condensate after the condensate pump 24
14 preheated condensate before the high-pressure steam cooler 16
15 turbocompressor
16 high-pressure steam cooler
17 heat exchanger
18 heater
19 high-pressure turbine stage
20 condensate preheater
21 low-pressure steam/exhaust gas cooler
22 low-pressure turbine stage
23 condenser
24 condensate pump
25 residual gas
26 fuel gas
27 oxygen
28 starting motor
29 generator
30 turbine cooling system
31 surplus condensate drain
32 common shaft of turbine, compressor and generator

I claim:

1. A method for separating residual gases and working fluid in a combined cycle water/steam process, wherein steam, used as a working fluid, is subjected to multi-stage compression and a mixture of the working fluid and reaction products of liquid and/or gaseous fuels is subjected to multi-stage expansion, and wherein an energy supply in fuel form is effected directly before or at a blading of selected turbine stages, the method which comprises:
    subjecting an expanded exhaust gas from a high-pressure turbine stage to a cooling process prior to further compression, and thereby cooling the expanded exhaust gas from the high-pressure turbine stage at least to a condensation temperature of a steam contained in the exhaust gas;
    carrying off uncondensed parts of the exhaust gas from the combined cycle water/steam process; and
    carrying out a condensation of the working fluid, leading-off of uncondensed residual gases, expansion of a working fluid condensate, and evaporation of the condensed working fluid in a residual gas separator connected upstream of a multi-stage turbocompressor and a low-pressure turbine stage.

2. The method according to claim 1, wherein the cooling process comprises cooling the expanded exhaust gas leaving the high-pressure turbine stage in a multi-stage cooling process.

3. The method according to claim 2, wherein the multi-stage cooling process comprises first cooling the expanded exhaust gas leaving the high-pressure turbine stage in a heat exchanger and then cooling the exhaust gas in a condensate preheater and in a low-pressure steam/exhaust gas cooler.

4. The method according to claim 1, which comprises obtaining an evaporation heat required for converting the condensate into the working fluid from the condensation heat to be dissipated.

* * * * *